United States Patent [19]

Koai

[11] Patent Number: 4,998,791
[45] Date of Patent: Mar. 12, 1991

[54] INTEGRATED OPTICAL SWITCHES WITH VERY HIGH EXTINCTION RATIOS

[75] Inventor: Kwang T. Koai, Acton, Mass.

[73] Assignee: GTE Laboratories Incorporated, Waltham, Mass.

[21] Appl. No.: 422,271

[22] Filed: Oct. 16, 1989

[51] Int. Cl.$^5$ ................................................ G02B 6/10
[52] U.S. Cl. .................................. 350/96.14; 350/96.13
[58] Field of Search ............... 350/96.12, 96.13, 96.14, 350/96.15

[56] References Cited

U.S. PATENT DOCUMENTS

| | | | |
|---|---|---|---|
| 4,618,210 | 10/1986 | Kondo | 350/96.13 |
| 4,773,721 | 9/1988 | Erman et al. | 350/96.13 |
| 4,818,050 | 4/1989 | Duthie | 350/96.15 X |
| 4,822,124 | 4/1989 | Suzuki | 350/96.12 X |
| 4,852,958 | 8/1989 | Okuyama et al. | 350/96.15 X |
| 4,859,022 | 8/1989 | Opdahl et al. | 350/96.15 X |

OTHER PUBLICATIONS

Lars Thylen, "Integrated Optics in LiNbO$_3$ Recent Developments in Devices for Telecommunications", Journal of Lightwave Technology, Jun. 1988; pp. 847–861.
Rod C. Alferness, "Waveguide Electrooptic Modulators", IEEE Transactions on Microwave Theory and Techniques, Aug. 1982; pp. 1121–1137.
Tadashi Saitoh and Takaai Mukai, "Recent Progress in Semiconductor Laser Amplifiers", Journal of Lightwave Technology, Nov. 1988; pp. 1656–1664.

Primary Examiner—William L. Sikes
Assistant Examiner—Akm E. Ullah
Attorney, Agent, or Firm—James J. Cannon, Jr.; Victor F. Lohmann, III

[57] ABSTRACT

A 1×2 integrated optical switch is a monolithic integration of two high-extinction cascaded coupled-waveguide modulators, one of said modulators being a bar-type modulator to provide a straight-through path and the second being a cross-type to provide a cross-over path between input and outputs. The primary and secondary waveguides in each section of the cross-type and the bar-type modulators respectively serve to dissipate unwanted crosstalk. A 2×1 integrated optical switch is obtained by reversing the waveguide patterns. The addition of waveguide bends to ends of the secondary waveguides of each modulator results in a bidirectional 1×2/2×1 integrated optical switch.

18 Claims, 3 Drawing Sheets

4,998,791

INTEGRATED OPTICAL SWITCHES WITH VERY HIGH EXTINCTION RATIOS

BACKGROUND OF THE INVENTION

This invention pertains generally to the field of integrated optical components for use in fiber optic communication systems, and more particularly it relates to photonic switching. Specifically, the invention is directed to new designs for integrated optical switches which enable such switches to have very high extinction ratios without stressing current and foreseeable fabrication technologies.

For the past few years, optical switching and multiplexing techniques have been seriously considered for future broadband networks. Integrated optical switches will probably play a key role in such applications because of their very large data bandwidth, high-speed capability and integratability. For other applications such as optical instrumentation, optical computing and signal processing, integrated optical switches are also potentially very useful.

Many devices have been proposed or demonstrated for use as integrated optical switches. Examples are directional couplers, reverse delta-beta couplers, X-switches and mode-sorting switches. The major problem encountered by these conventional devices is that their insertion loss and crosstalk are not trivial, and both tend to accumulate within the system in which they are used. The performance of optical systems using these conventional switches is often limited or degraded by these two factors. Recent advancements in optical amplifier technology have demonstrated that optical amplifier gain can compensate for optical loss. If the use of optical amplifiers in a system proves practical, the remaining important issue is crosstalk.

Crosstalk in a system results from the limited extinction ratio that individual switches can achieve. Typical integrated optical switches can achieve an extinction ratio in the range of 20 to 30 dB, if electrical tuning is performed. Although in some cases proper system architectures can be adopted to reduce the accumulation of crosstalk, a more fundamental solution is to increase the extinction ratios of the optical switches. More advanced or critical fabrication technology is often suggested to improve the extinction ratios of the switches. However, only limited improvements have been achieved in this respect. The fabrication in quantity of integrated optical devices with extinction ratios beyond 25 dB becomes very difficult.

In an earlier filed, copending U.S. patent application, Ser. No. 07/289,658, filed Dec. 23, 1988, entitled ULTRA-HIGH-EXTINCTION CASCADED COUPLED-WAVEGUIDE OPTICAL MODULATORS AND OPTICAL GATE ARRAYS, which is incorporated herein by reference as background information, I have disclosed a novel design for $1\times1$ integrated optical modulators which can achieve ultra-high extinction ratios without stressing the fabrication technology. In another earlier filed copending U.S. patent application, Ser. No. 07/414,984, filed Sep. 29, 1989, entitled HIGH-EXTINCTION $1\times2$ INTEGRATED OPTICAL SWITCH, S.-F. SU, inventor, which is also incorporated herein by reference as background information, discloses an integrated optical switch design with a 50 dB extinction ratio. Both of said applications are assigned to the assignee of this application.

SUMMARY OF THE INVENTION

The principal object of the present invention is to provide new and more generalized designs for integrated optical switches that can achieve nearly unlimited extinction ratios, that is, extinction ratios in excess of 150 dB.

Another object of the present invention is to provide new designs for $1\times2$ and $2\times1$ integrated optical switches having very high extinction ratios.

A further object of the invention is to provide such integrated optical switches which can be easily produced without stressing the fabrication technology.

A still further object of the invention is to provide integrated optical switches which avoid the above noted and other disadvantages of the prior art.

In a first aspect of the invention, a $1\times2$ (or a $2\times1$) integrated optical switch uses cascaded coupled-waveguide modulator with rank k, where k is the number of cascaded coupled-waveguide sections. This switch is a monolithic integration of two high-extinction cascaded coupled-waveguide modulators with rank $k=1$ to about 15, using current integrated optical technology. The switch consists of two arms, one of which is in the form of a bar-type cascaded coupled-waveguide modulator and the other of which is in the form of a cross-type cascaded coupled-waveguide modulator. The extinction ratio and the insertion loss of this switch device depend on the number of cascaded sections and can be designed to meet a specification. Undesirable crosstalk is dissipated by a multiplication process in each arm of the switch.

In a second aspect of the invention, multiple and diverse $1\times2$ and $2\times1$ integrated optical switches are possible using other types of integrated optical switches as building blocks.

In a third aspect of the invention, a bidirectional $1\times2/2\times1$ integrated optical switch is made by incorporating into the same integrated optical structure appropriate waveguide bends to guide out the unwanted crosstalk in both directions.

DESCRIPTION OF THE PREFERRED EMBODIMENTS

Figure 1:
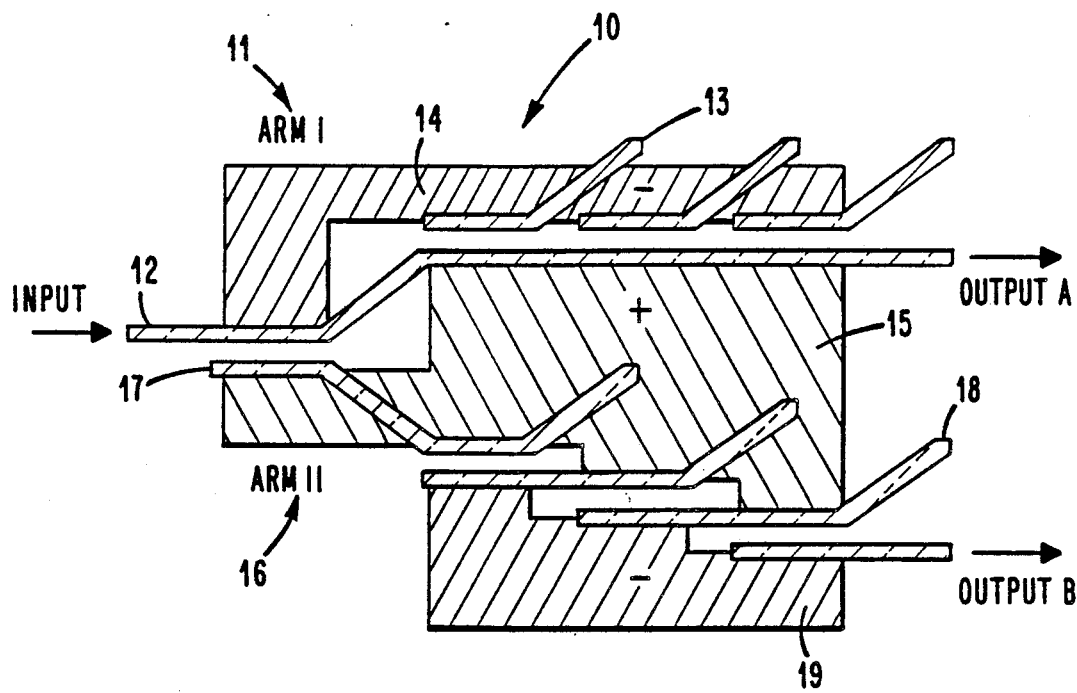
FIG. 1 is a diagrammatic top view of the preferred embodiment of a $1\times2$ integrated optical switch using directional couplers, according to the invention.
Figure 2:
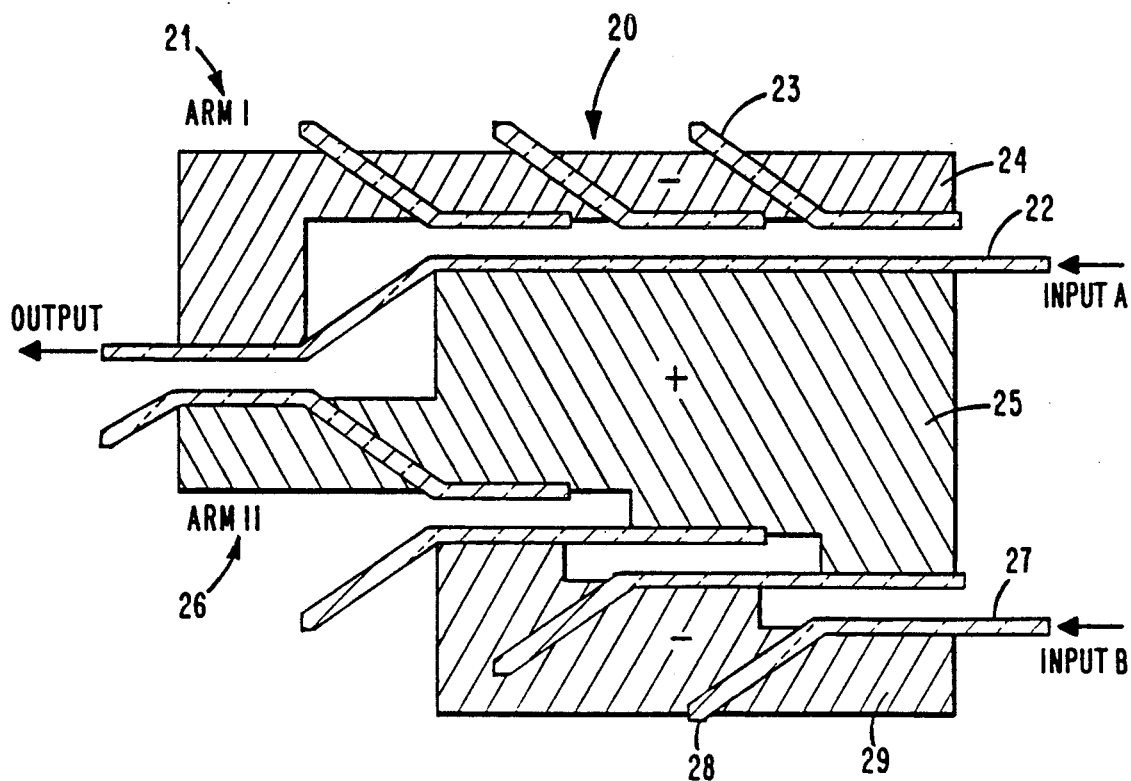
FIG. 2 is a diagrammatic top view of the preferred embodiment of a $2\times1$ integrated optical switch using directional couplers, according to the invention.

Referring now to the drawings, FIG. 1 and FIG. 2 are diagrammatic top views of the preferred embodiments of a $1\times2$ and a $2\times1$ integrated optical switches 10, 20 respectively, using directional couplers, with rank k=4, where k is the number of cascaded coupled-waveguide sections. To generalize, the 1×2 (or 2×1) integrated optical switch, according to the invention, is a monolithic integration of two high-extinction cascaded coupled-waveguide (CCW) modulators, with rank k=1 to about 15, using current integrated optical technology. The CCW modulators used herein are disclosed in my copending application Ser. No. 07/289,658, filed Dec. 23, 1988, cited above and incorporated herein by reference, specifically with respect to the description of the preferred embodiments and drawing figures describing and illustrating the bar-type and cross-type CCW modulators.

Specifically the 1×2 integrated optical switch 10 of FIG. 1 with rank k=4 consist of two arms 11, 16, ARM I and ARM II respectively. Arm 11 is in the form of a bar-type CCW modulator, and arm 16 is in the form of a cross-type CCW modulator. The shaded areas are the negative electrodes 14, 19 and the positive electrode 15 which is shared by both arms 11, 16. The electrode patterns 14, 15, 19 are on top of the substrate of integrated optical switch 10. In both types of CCW modulators, each section can be considered as an individual optical waveguide directional coupler. The rank of each CCW is the number of coupled-waveguides which are cascaded together. The CCW modulator of arm 11 is described as bar-type because its structure provides a direct optical connection between an input end and an output end of the modulator such that an input signal in the primary waveguide can propagate straight through the modulator, whereas optical signals coupled from the primary waveguide to secondary waveguides are guided out of the modulator. The CCW modulator of arm 16 is a cross-type modulator structure in which the input optical signal is repeatedly coupled from a primary waveguide to a secondary waveguide in each section before reaching the output end, whereby the coupled optical signal serves as the input signal for a next section. The structure and operation of the bar-type and cross-type CCW modulators is fully disclosed in my prior application which is incorporated herein by reference. For purposes of this exposition, the first section of each CCW modulator or arm 11, 16 comprises integrated waveguides 12, 17. For subsequent sections of the bar-type CCW modulator of arm 11, integrated waveguide 12 is the primary waveguide and integrated waveguides 13 are the secondary waveguides, one for each section. For subsequent sections of the cross-type CCW modulator of arm 16, integrated waveguide 17 is the secondary waveguide of the first section and the primary waveguide of the second section while one of the waveguides 18 is the secondary waveguide of one section and the primary waveguide of the next section.

The 1×2 integrated optical switch of FIG. 1 can be operated in two states, the straight-through state and the cross-over state. In the straight-through state, the input light signals pass through arm 11 from the input to output A, remaining in primary integrated optical waveguide 12. In this state, all of the coupled-waveguide sections are driven to their straight-through states, and thus the input light signals are guided to output A. At this time, any of the inputted light signals detected by output B are considered to be crosstalk. It is clear from FIG. 1 that crosstalk is reduced dramatically by the multiplication process in arm 16 before reaching output B, the stray light signal being dissipated primarily through waveguides 18.

In the cross-over state, the input light signals pass through arm 12 from the input to output B. In this state, all of the coupled waveguide sections are driven to their cross-over states, thus the input light signals are guided to output B. The crosstalk that reaches output A is now reduced dramatically by the multiplication process in arm 11, the stray light signals being dissipated primarily by secondary waveguides 13.

For purposes of illustration and exposition, the 1×2 integrated optical switch of FIG. 1 is shown to be of rank 4. As stated previously, the rank can range from k=1 to about 15, using current integrated optical technology. The extinction ratio and the insertion loss of this switch depend on the number of cascaded sections and can be designed to meet a specification. If, using the embodiment shown in FIG. 1, the individual coupled waveguide sections have an average extinction ratio X=20 dB (i.e., crosstalk=−20 dB), the overall extinction ratio of the illustrated switch becomes k xX=4×20=80 dB. Since k can range up to about 15 using current lithium niobate technology, integrated optical switches of this design with very high extinction ratios are therefore achievable without stressing the fabrication technology.

In the following discussion of FIGS. 2 through 5, the reference numbers of component parts of the integrated optical switches will be similar to the numbers in FIG. 1, except that the digit in the tens column will correspond to the figure number.

FIG. 2 is a top view of a 2×1 integrated optical switch 20 using directional couplers with rank k=4, similar to the 1×2 switch of FIG. 1, but with the waveguide patterns reversed in direction. It is also a monolithic integration of two CCW modulators, having a first arm 21 and a second arm 26. Arm 21 is a bar-type CCW modulator having a primary waveguide 22 and secondary waveguides 23 and electrodes 24 and 25. Arm 26 is a cross-over-type CCW modulator having a first waveguide 27 and subsequent waveguides 28, and electrodes 25, shared with arm 21, and 29. In its first state, which is equivalent to a straight-through state, only optical signals appearing on input A will pass through to the output. In its second state, equivalent to a cross-over state, only optical signals appearing on input B will cross-over to the output.

Figure 3:
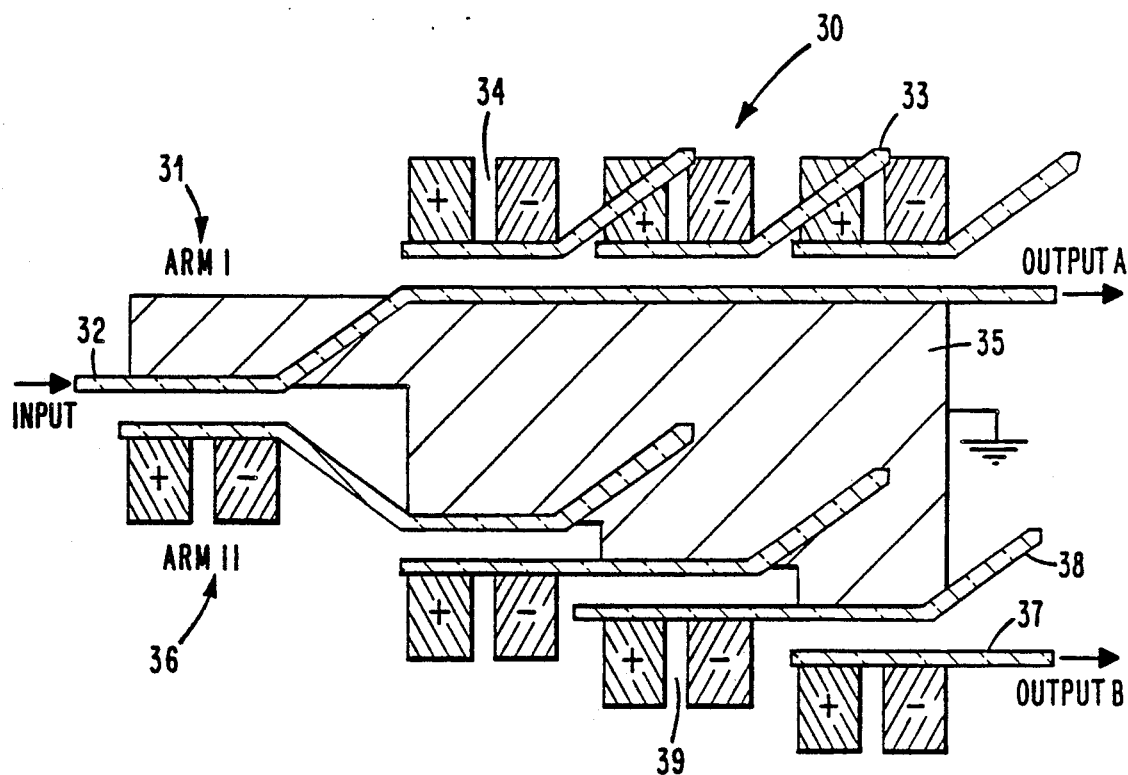
FIG. 3 is a diagrammatic top view of an alternate embodiment of the integrated optical switch of FIG. 1, using reverse delta-beta couplers.
Figure 4:
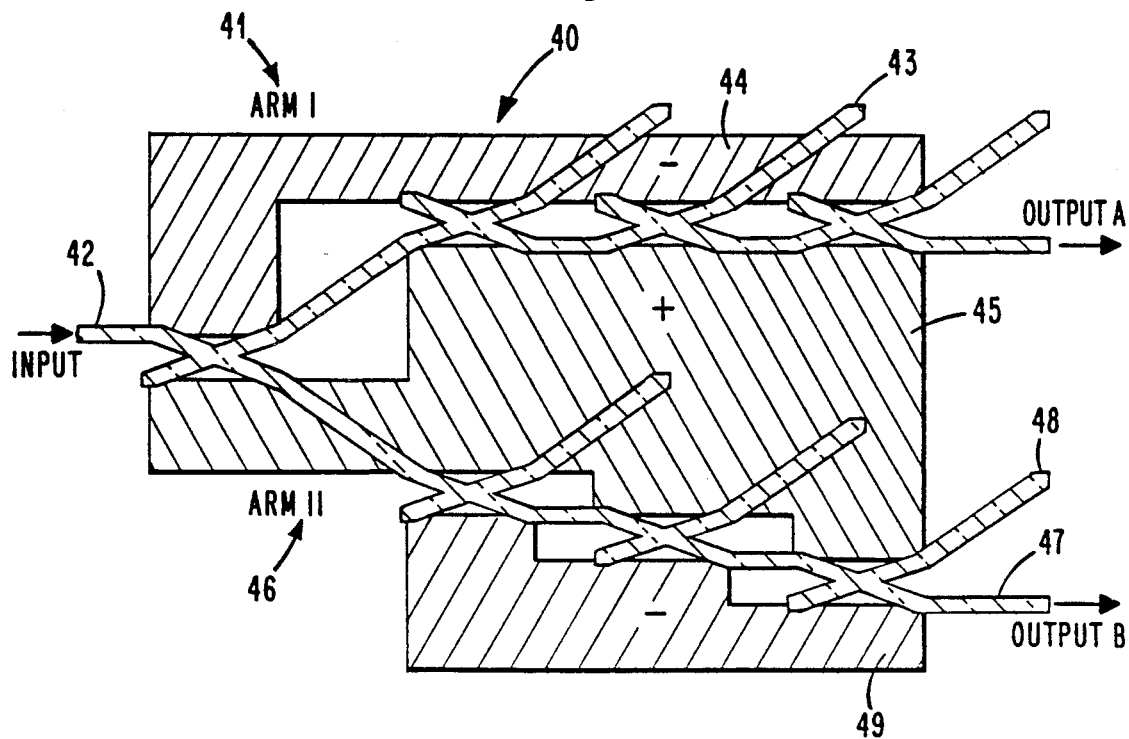
FIG. 4 is a diagrammatic top view of an alternate embodiment of the integrated optical switch of FIG. 1, using cross-switches.
Figure 5:
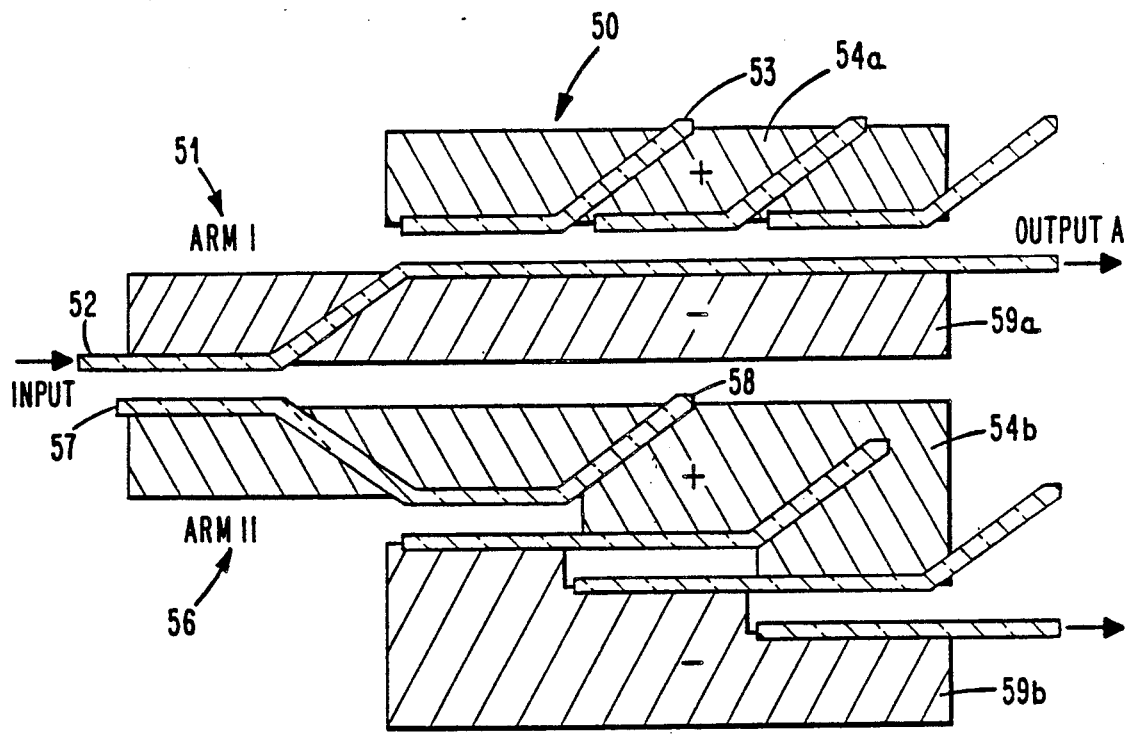
FIG. 5 is a diagrammatic top view of an alternate embodiment of the integrated optical switch of FIG. 1, using alternative electrode patterns.

The embodiments shown in FIGS. 1 and 2 use directional couplers as building blocks. In fact, any integrated optical switches with simple structures can be used as building blocks. For example, FIG. 3 shows a 1×2 integrated optical switch 30 according to the invention using reverse delta-beta couplers. In the switch 30, the patterns of electrodes 34, 38 and 35 is adapted to meet the requirements of the reverse delta-beta couplers. Electrode 35 is the shared electrode. In other examples, FIG. 4 shows an integrated optical switch 40 using cross-switches as building blocks and FIG. 5 shows a different pattern of electrodes. In FIG. 5, switch 50 is essentially identical to switch 10 of FIG. 1, except that there are four electrodes 54a, 59a and 54b, 59b. There is no shared electrode.

Figure 6:
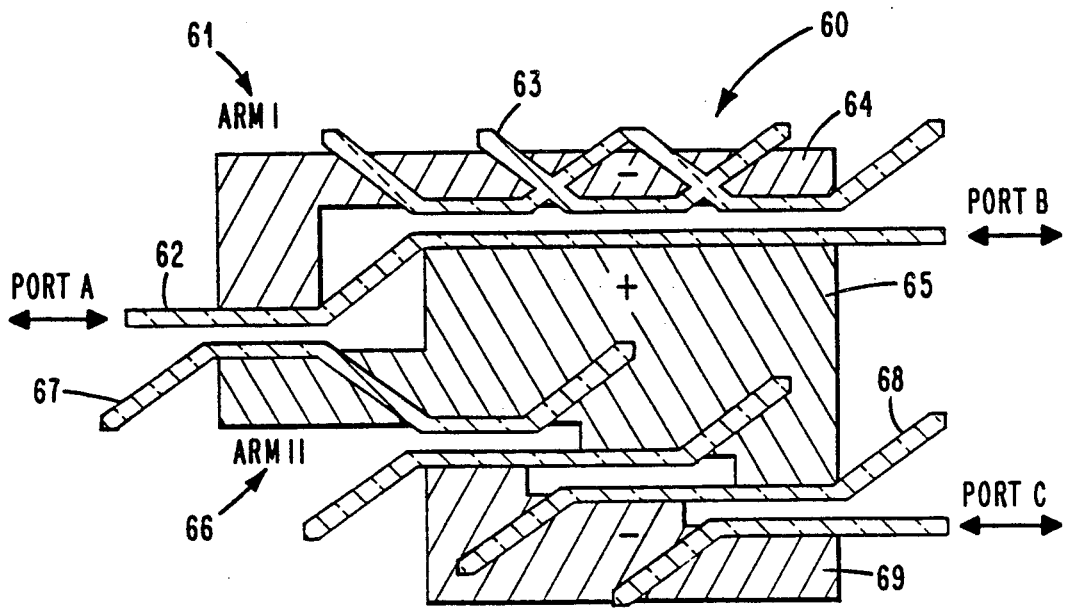
FIG. 6 is a diagrammatic top view of the preferred embodiment of a $1\times2/2\times1$ bidirectional integrated optical switch, according to the invention.

FIG. 6 shows an embodiment of a bidirectional integrated optical switch 60 according to the invention, incorporating 1×2 and 2×1 switches 10, 20 of FIGS. 1 and 2 into the same structure. This is accomplished by adding waveguide bends to waveguides 63, 68 to guide out the unwanted crosstalk in both directions, as shown in FIG. 6.

The general principles of the invention can be extended to the use of any other type of integrated optical switches as building blocks, for example, mode-sorting switches and reflection switches. Integrated optical switches according to the invention can be implemented in any material system suitable for integrated optics, such as lithium niobate, III–V compound semiconductors and silica glass. And the control of the integrated optical switches according to the invention can be extended from using electrooptic effect as a control mechanism to using other control mechanisms such as thermal, magnetooptic and nonlinear effects on optical materials.

What is claimed is:

1. A $1 \times 2$ integrated optical switch of rank $k=n$, where $0 < n < 15$, having a very high extinction ratio, comprising:
   a first integrated cascaded coupled-waveguide modulator of rank $k=n$, having an input serving as the input of said switch and an output serving as a first output of said switch;
   said first modulator being a bar-type modulator of n sections having a primary waveguide and a plurality of secondary waveguides;
   a second integrated cascaded coupled-waveguide modulator of rank $k=n$, having an input and having an output serving as a second output of said switch;
   said second modulator being a cross-type modulator of n sections, having a plurality of waveguides, each of which serves as a primary waveguide in one of said sections and as a secondary waveguide in the preceding section;
   said first and second modulators being monolithically integrated such that the primary and secondary waveguides of the first section of said first modulator serve also as the primary and secondary waveguides of the first section of said second modulator, and said input of said first modulator is the input of said second modulator;
   such that said first bar-type integrated cascaded coupled-waveguide modulator forms a straight-through path from said input to said first output, and said second cross-type integrated cascaded coupled-waveguide modulator forms a cross-over path from said input to said second output; and
   such that the extinction ratio of said switch is the product of the average extinction ratio of a section of the modulator of said path times the rank of said modulator.

2. The integrated optical switch of claim 1 wherein each section of said first and second cascaded coupled-waveguide modulators comprises a directional coupler.

3. The integrated optical switch of claim 1 wherein each section of said first and second cascaded coupled-waveguide modulators comprises a reverse delta-beta coupler.

4. The integrated optical switch of claim 1 wherein each section of said first and second cascaded coupled-waveguide modulators comprises a cross-switch.

5. The integrated optical switch of claim 1 wherein each of said modulators includes:
   one electrode of a first polarity and one electrode of a second polarity;
   said electrodes being disposed about said waveguides in patterns which enable said electrodes to function as an electrooptic control means.

6. A $2 \times 1$ integrated optical switch of rank $k=n$, where $0 < n < 15$, having a very high extinction ratio, comprising:
   a first integrated cascaded coupled-waveguide modulator of rank $k=n$, having an input serving as a first input of said switch, and an output serving as the single output of said switch;
   said first modulator being a bar-type modulator of n sections having a primary waveguide and a plurality of secondary waveguides:
   a second integrated cascaded coupled-waveguide modulator of rank $k=n$, having an input serving as a second input of said switch, and an output;
   said second modulator being a cross-type modulator of n sections, having a plurality of waveguides, each of which serves as a primary waveguide in one of said sections and as a secondary waveguide in the preceding section:
   said first and second modulators being monolithically integrated such that the primary and secondary waveguides of the last section of said first modulator serve also as the primary and secondary waveguides of the last section of said second modulator, and said output of said first modulator is the output of said second modulator;
   such that said first bar-type integrated cascaded coupled-waveguide modulator forms a straight-through path from said first input to said output, and said second cross-type integrated cascaded coupled-waveguide modulator forms a cross-over path from said second input to said output: and
   such that the extinction ratio of said switch is the product of the average extinction ratio of a section of the modulator of said path times the rank of said modulator.

7. The integrated optical switch of claim 6 wherein each section of said first and second cascaded coupled-waveguide modulators comprises a directional coupler.

8. The integrated optical switch of claim 6 wherein each section of said first and second cascaded coupled-waveguide modulators comprises a reverse delta-beta coupler.

9. The integrated optical switch of claim 6 wherein each section of said first and second cascaded coupled-waveguide modulators comprises a cross-switch.

10. The integrated optical switch of claim 6 wherein each of said modulators includes:
    one electrode of a first polarity and one electrode of a second polarity;
    said electrodes being disposed about said waveguides in patterns which enable said electrodes to function as an electrooptic control means.

11. A bidirectional $1 \times 2/2 \times 1$ integrated optical switch of rank $k=n$, where $0 < n < 15$ having a very high extinction ratio comprising:
    a first integrated cascaded coupled-waveguide modulator of rank $k=n$, having a first port at first end serving as one of two ports on first side of said switch, and a second port at a second end serving as the single port on a second side of said switch;
    said first modulator being a bar-type modulator of n sections having a primary waveguide and a plurality of secondary waveguides:
    a second integrated cascaded coupled-waveguide modulator of rank $k=n$, having a first port on a first end serving as a second port on said first side of said switch, and a second port on a second end;

said second modulator being a cross-type modulator of n sections, having a plurality of waveguides, each of which serves as a primary waveguide in one of said sections and as a secondary waveguide in the preceding section;

each of said secondary waveguides of each of said modulators having waveguide bends at each end thereof so that said secondary waveguides guide out unwanted crosstalk from optical signals in either direction of said bidirectional switch;

said first and second modulators being monolithically integrated such that the primary and secondary waveguides of one end section of said first modulator serve also as the primary and secondary waveguides of the corresponding end section of said second modulator, and said single port at said second side of said switch of said first modulator is a port of said second modulator;

such that said first bar-type integrated cascaded coupled-waveguide modulator forms a straight-through path from said first port on said first side to said single port on said second side, and said second cross-type integrated cascaded coupled-waveguide modulator forms a cross-over path from said second port on said first side to said single port on said second side; and such that the extinction ratio of a path from one of said ports on said first side to said single port on said second side of said switch is the product of the average extinction ratio of a section of the modulator of said path times the rank of said modulator.

12. The integrated optical switch of claim 11 wherein each section of said first and second cascaded coupled-waveguide modulators comprises a directional coupler.

13. The integrated optical switch of claim 11 wherein each section of said first and second cascaded coupled-waveguide modulators comprises a reverse delta-beta coupler.

14. The integrated optical switch of claim 11 wherein each section of said first and second cascaded coupled-waveguide modulators comprises a cross-switch.

15. The integrated optical switch of claim 11 wherein each of said modulators includes:
   one electrode of a first polarity and one electrode of a second polarity;
   said electrodes being disposed about said waveguides in patterns which enable said electrodes to function as an electrooptic control means.

16. The integrated optical switch of claim 5 wherein both of said modulators share an electrode of one polarity.

17. The integrated optical switch of claim 10 wherein both of said modulators share an electrode of one polarity.

18. The integrated optical switch of claim 15 wherein both of said modulators share an electrode of one polarity.

* * * * *